United States Patent [19]

Gottlich et al.

[11] Patent Number: 5,932,869

[45] Date of Patent: Aug. 3, 1999

[54] PROMOTIONAL SYSTEM WITH MAGNETIC STRIPE AND VISUAL THERMO-REVERSIBLE PRINT SURFACED MEDIUM

[75] Inventors: Stephen Gottlich, Overland Park, Kans.; Jacob B. Horwitz, Palmdale, Calif.

[73] Assignee: Graphic Technology, Inc., New Century, Kans.

[21] Appl. No.: 08/774,961

[22] Filed: Dec. 27, 1996

[51] Int. Cl.[6] .................................................. G06K 19/06
[52] U.S. Cl. ........................ 235/493; 235/380; 235/449; 235/475; 902/27
[58] Field of Search ..................... 235/493, 487, 235/488, 492, 494, 375, 380, 435, 439, 440, 449, 475; 902/27

[56] References Cited

U.S. PATENT DOCUMENTS

| | | | |
|---|---|---|---|
| 4,650,975 | 3/1987 | Kitchener | 235/375 |
| 4,723,212 | 2/1988 | Off et al. | 235/385 |
| 4,803,351 | 2/1989 | Shigenaga | 235/492 |
| 4,812,632 | 3/1989 | Kakinuma et al. | 235/479 |
| 4,855,578 | 8/1989 | Hirokawa et al. | 235/380 |
| 4,873,427 | 10/1989 | Virdia | 235/492 |
| 4,910,672 | 3/1990 | Off et al. | 235/383 X |
| 4,916,441 | 4/1990 | Gombrich | 235/380 X |
| 4,922,111 | 5/1990 | Kuwano et al. | 235/472.01 X |
| 5,047,614 | 9/1991 | Bianco | 235/385 |
| 5,055,660 | 10/1991 | Bertagna et al. | 235/472 |
| 5,173,851 | 12/1992 | Off et al. | 364/401 |
| 5,206,520 | 4/1993 | Filo | 250/568 |
| 5,221,838 | 6/1993 | Gutman et al. | 235/379 |
| 5,250,789 | 10/1993 | Johnsen | 235/383 |
| 5,260,552 | 11/1993 | Colbert et al. | 235/472.01 X |
| 5,268,963 | 12/1993 | Monroe et al. | 380/23 |
| 5,282,651 | 2/1994 | Alonso | 283/117 |
| 5,294,782 | 3/1994 | Kumar | 235/380 X |
| 5,324,922 | 6/1994 | Roberts | 235/375 |
| 5,380,991 | 1/1995 | Valencia et al. | 235/383 |
| 5,386,106 | 1/1995 | Kumar | 235/380 X |
| 5,391,872 | 2/1995 | Itoh et al. | 250/316.1 |
| 5,397,881 | 3/1995 | Mannik | 235/380 |
| 5,408,077 | 4/1995 | Campo et al. | 235/380 |
| 5,424,524 | 6/1995 | Ruppert et al. | 235/383 X |
| 5,459,306 | 10/1995 | Stein et al. | 235/383 |
| 5,489,138 | 2/1996 | Wang et al. | 235/379 X |
| 5,489,773 | 2/1996 | Kumar | 235/380 X |
| 5,490,956 | 2/1996 | Kito et al. | 252/583 |

OTHER PUBLICATIONS

Star Micronics, "The MCP–200 Visual Card System," *month & year missing.

Ricoh Co., Ltd., "Thermo–reversible Imaging Media (TRIM)." *month and year missing.

Ricoh Co., Ltd., "Thermochromic (TC) Film Product Information, FB651–M Type, Rewritable Media." *month & year missing.

Toyo Electronics Corp., "Rewrite Card System." *month & year missing.

*Primary Examiner*—Michael G. Lee
*Attorney, Agent, or Firm*—Spencer Fane Britt & Browne LLP

[57] ABSTRACT

A promotional system is provided which provides a user with human readable and machine readable message responses to transactions in which the responses are formed by a transaction unit and based upon the user's present transaction while taking into account the user transaction history, the responses including calculations based on a set of promotional program rules to form a message response for the user and without the need for the transaction unit to communicate with a central memory or processing unit.

21 Claims, 5 Drawing Sheets

PROMOTIONAL SYSTEM WITH MAGNETIC STRIPE AND VISUAL THERMO-REVERSIBLE PRINT SURFACED MEDIUM

BACKGROUND OF THE INVENTION

A. Field of the Invention

The present invention relates to an affordable, yet effective, system and apparatus for determining, upon request, an appropriate personalized and individually-targeted response for a particular user based upon current user-specific data with real-time delivery of that response to the user in non-volatile, re-writable visual format.

B. Description of the Prior Art

In today's competitive environment, businesses are in a constant battle to increase market share. As a result, each day we are exposed to an extensive variety of marketing techniques, including broadcast advertising on television and radio; print advertising in magazines and newspapers; various coupon delivery systems; direct mail; billboards; contests; and in-store displays. Although such advertising serves its purpose in providing widespread exposure of a product or service to the public, it has its limitations as well. For example, consumers that are constantly being bombarded from so many directions become immune to the message and may either tune it out unconsciously by disregarding it or literally by a flip of a switch, touch of the remote control, or toss into the trash can. In an environment of such saturation, it is difficult to communicate with a specific consumer in a meaningful manner so as to precipitate a desired response to the message. Further, even when these marketing techniques actually cause a consumer to choose a particular product or service, the overwhelming variety of options being thrown at the customer daily makes customer loyalty hard to attain. In addition to the glut of marketing messages, another factor responsible for the ineffectiveness of many of these marketing techniques lies in the treatment of consumers collectively rather than as individuals. It is much easier to ignore a message delivered to "anyone" and "everyone" than one delivered personally. Thus, what is needed is a marketing system that personalizes the message. As a result, the consumer's attention will be focused on that product or service and the ability to build customer loyalty will be greatly increased.

Couponing is one method that has received attention as a way of personalizing the marketing effort. For instance, coupons or other promotions may be targeted through the use of prepared mailing lists which selectively identify persons with demographic characteristics and consumption histories believed to make them more inclined to buy a particular product or service than the general public. These demographic characteristics and consumption histories are compiled through the use of huge databases and powerful computers. Although this technique may result in more meaningful and, it is hoped, more effective advertising, the problem here, once again, is that consumers are flooded with such mailings. It is easy for the consumer to disregard the mailing and toss it away. Moreover, even if the consumer acts on a coupon to visit a particular business one week, that consumer will undoubtedly have another coupon beckoning the consumer's attention somewhere else the next week.

Other forms of targeted couponing include placing coupons on or in a product for use on the consumer's next purchase of that or a related product or issuing a coupon at the checkout for a related item based on an item currently being purchased. For example, if the consumer purchases dog food, the register might kick out a coupon for dog shampoo. Because the coupon delivery in this case is directly linked to a consumer's current purchase of a given product or service, it may be assumed that such a consumer is more likely to act on that coupon. Although such a system recognizes the importance of a consumer's purchasing history in targeting and personalizing the marketing message, it has the disadvantage of basing the response, in the form of the coupon generated, on what the consumer is purchasing at that one visit. One purchase is not an effective indicator of a consumer's long-term needs or desires. Such a system has no ability to "learn" from the consumer's overall consumption history and thus present the consumer with promotions that are highly individualized to meet that consumer's needs and desires. Moreover, mere delivery of a somewhat-focused coupon response does little to personalize the message.

U.S. Pat. No. 5,459,306 to Stein et al., in acknowledging the advantages of a more personalized marketing approach, employs knowledge of a consumer's previous purchasing history to produce targeted promotions and product recommendations. These promotions and product picks are then delivered to the consumer at the store to assist them in making a product choice. According to the Stein et al. system, a new user is issued an identifying code and that user's personal information is gathered and entered into a database at the store. As the consumer makes product choices, the consumer's purchase or rental history is also stored on site at the location of the purchase or rental in data processing retrievable format. Promotional offers, new product information, and the like are then downloaded to the store from a central host location for use by the store in preparing personalized product picks. Also downloaded from the host is a set of rules for making determinations as to appropriate product suggestions for a user based on that user's personal information and purchasing history, current promotional offers, and the availability of specific products at that store. When the user enters his/her unique code into a data processing means at the store such as a kiosk, a POS system, or stand-alone CPU, the user code is correlated with the in-store maintained personal and purchasing information. Then, the rules are applied, and a decision is made as to what currently-available products would most likely be of interest to that user. Product picks or recommendations based on currently-available stock are then recommended in printed format such as in a paper coupon.

One important disadvantage of the Stein et al. system, however, is that it relies on storage of a user's personal and purchasing history on site at the store or other such location. In Stein, it is suggested that this information be stored in the POS system or in the coupon controller device. It is further suggested that, on an infrequent-but-regular basis, the data regarding new customers, or the purchasing or other history as to current customers, be batched and sent via a communication link to a central host system. Similarly, as rules or promotions change, they may be downloaded to all of the various store locations from the host. It is recognized, however, that it is not feasible to download information sent back to the host regarding a particular consumer at store A to stores B, C, D, etc., as the volume of information would be unmanageable. In addition, even if a customer's information from one store was linked to the other stores, it would only be available once a day or less often—after accomplishment of the upload/download with the host system. Thus, if a particular consumer visited store A in the morning and store B later that day, there would be no record at store B of the earlier purchase, rental, or other transaction.

Stein is directed primarily to the video rental business where, as the patent acknowledges, it is unusual for an individual user to use the system more than once a day. In such a case, the once-a-day polling of the in-store computer to transfer information to the host is seen as sufficient. Such would not be the case in many other businesses. It would also be impractical in coordinated marketing efforts where, for example, a purchase of food items by consumers of a specified age range during a specific time of day might precipitate the printing of a coupon for a discount on the rental of a videotape. If, however, the consumer had already rented the video, the discount coupon could be received with antagonism—an undesirable result. If the system were smart enough to know that the consumer had already rented the video, it could, for example, print out a discount coupon for a car wash or something else. Thus, it is evident that a system is needed that can provide personalized promotions and information to a consumer based on his or her up-to-the-minute purchasing history regardless of which stores or store locations he or she visits.

Another drawback of systems such as that disclosed in Stein et al. is its expense and its inability to adapt to a widely-varying set of business environments. Because the Stein system is dependent on a POS system, kiosks, and/or coupon controllers, the equipment expense may be prohibitive for many businesses. Further, even where a business already has a POS in place, there are many different interfaces and formats used in the wide variety of POS systems currently available on the market. Thus, the software, hardware, and other required components of the Stein system would have to be available in a multitude of formats to be adaptable to every site. In the alternative, the Stein system could be customized as an order for the system was received. Either way, however, offering a system that must be customized for each specific application would drive the costs too high to make it practical for a wide variety of uses. Thus, it would be advantageous to have a system that offers the advantages of personalized promotion and communication across the spectrum of POS systems without requiring expensive equipment for effective operation.

Equipment costs and the inability to service a user at multiple locations also affects the ability of a system such as the one disclosed in Stein to share the information gathering and targeted communication capabilities among multiple businesses or organizations. For instance, a restaurant which typically caters to small children may wish to install a system for a frequent-shopper program at multiple locations. It would be desirable if another business, like an amusement park, could co-sponsor such a promotion where, for example, a reduced-admission ticket to the park is offered upon a predetermined number of visits to the restaurant or after reaching a dollar value purchase threshold. As previously discussed, the Stein system does not provide an effective method for keeping track of a customer's current purchasing history at each store location. Uploading and downloading the information on every customer to each store would, at best, be slow and would require extensive memory capabilities at each location. Where the business wishing to use such a system was national or international with tens of thousands of locations and hundreds of thousands or even millions of customers, it is easy to see that such shared offerings would not be feasible. Thus, the shared promotional effort would, in effect, be confined to one or, at most a few, store locations, greatly diminishing its desirability. Shared promotional offerings would also require enhanced data processing capabilities to make more sophisticated determinations based on a greater number of parameters. Under the Stein system, this would again require expensive equipment at each system location. Thus, a system is needed that can be used in multiple locations with information regarding the user current at all times without the need for expensive equipment investments and constant polling, uploading, and downloading of data.

U.S. Pat. No. 5,380,991 to Valencia et al. discloses use of an integrated circuit ("IC") or "smart card" for a paperless coupon redemption system wherein a consumer purchases or is given a card with on-board intelligence. That consumer then selects coupons for products of interest to him/her, and these "picks" are then stored on the card. The consumer carries the card into a business of his/her choice where coupon amounts recorded on the card are automatically deducted from the total bill at check-out with update of the card information to show that a particular coupon has been redeemed. This system is somewhat personalized in that it permits the customer to take advantage of selected and, therefore, targeted coupons at the store of his/her choice. Further, because the customer's coupon picks are on a card which they carry, they are available for use at any time and at any system location. In addition, multiple businesses may take advantage of the system by offering their coupons for selection. While Valencia provides a good solution to targeted coupon distribution, it does not go further to provide personal interaction with the consumer at the place of business where he/she has chosen to shop. There is no personalization which would entice repeated visits, no opportunity to run frequent shopper programs or other such contests or events, and nothing to encourage a customer to try a new product or place of business. This is a static product.

Other types of user card systems have been employed to achieve a targeted system of promotion and/or communication with a particular user. In Kakinuma et al., for example, a portable magnetic card reading and writing apparatus is disclosed. The user card or data record card in Kakinuma consists of a card such as those used for credit cards provided with heat-sensitive paper at one portion of the card and a magnetic tape- at another segment of the card. The magnetic tape is similar to that on a typical credit card and may be used for recording, reading, and rerecording of machine readable/writeable data. The heat-sensitive paper serves to accommodate a visual display of the information recorded in the magnetic strip. In this manner, visual feedback is offered to the user rather than the mere machine-readable update of the information on the card as proposed in Valencia.

The visual output to the card in Kakinuma, however, is merely a direct display of the user-supplied information. A user inputs data through use of a key pad or other such entry device and the information so inputted is then written into the magnetic stripe in machine-readable format and onto the heat-sensitive paper in human-readable format. Because the Kakinuma system is principally drawn to use as a check issuing card, it is sufficient for that application that the information written in human readable form on the heat sensitive tape is confined to the information or data input via a keyboard by the user. For instance, a user may input a check amount and a date of issuance and this data is then entered in visual and magnetic form upon the card. There is no teaching in Kakinuma to provide sufficient storage and data processing capabilities within the printer/reader/writer apparatus so that intelligent responses, such as those required for use in a personalized frequent shopper or customer loyalty program, may be determined from the data entered by the user in correlation with data stored within the unit. To have a system which is effectively personalized and targeted in its responses to the user, it is necessary to provide more than mere feedback to the user of the information the user has supplied.

While the immediate visual display of information to the user can be a positive feature in achieving the desired personalization of communication with a user, the heat-sensitive template disclosed in Kakinuma has its weaknesses. First, while it is not expressly disclosed in Kakinuma, heat-sensitive paper is short-lived in its ability to store information. Fading and/or bleaching makes the printed information difficult to read over time. Also, as with any paper product, introduction of moisture or humidity is destructive. Second, heat-sensitive paper can be used only once. It cannot be erased and rewritten upon. Thus, the card disclosed in Kakinuma makes a permanent visual record that does not accommodate the repeated updates necessary to provide a user with a continuously-current personalized response. Third, heat-sensitive paper is rudimentary in its display capabilities, not allowing for high-quality graphics or other sophisticated responses to a user. Further, there is no indication in Kakinuma that there is sufficient memory and processing capability within the card reading/writing apparatus disclosed to accomplish more than the mere reiteration of the user-supplied information into the visual display. Sufficient memory and processing capabilities, as well as a more effectual display means, are required to accommodate sophisticated promotional communications such as rewards for frequent shopping, contests, games, sweepstakes, or shared marketing programs in which various company trademarks could be displayed.

Star Micronics® has offered what it calls a "Visual Card" with related reader/writer apparatus. As in Kakinuma, the Visual Card is a card employing a magnetic strip for recording and re-recording of machine-readable information in combination with a visual print region. Unlike the heat-sensitive paper in Kakinuma, human readable text in the Visual Card System is laid down by means of magnetic particles which are aligned by a recording head to produce characters. Thus, the Visual Card System has an advantage over Kakinuma in that the visual text may be erased and rewritten. There are problems with this method of visual display as well, however, in that the print field on the Visual Card is quite limited in area, being offered as only a three-line print region. Further, any introduction of a magnetic field will tend to cancel or disrupt the visual image, making it highly unstable. In addition, the Visual Card System offers no keyboard or other direct data input means apart from connection to an external device such as a computer. Moreover, the apparatus of the Visual Card System does not include on-board memory and processing capabilities to provide sophisticated visual responses to the user based solely on the information stored on the card, and in the apparatus itself, without the need to link to an expensive external device. Thus, although the Visual Card carries data on the card itself and, therefore, has the potential of bringing current user purchasing information with it to each site location, the Visual Card System still requires expensive additional equipment such as a computer or POS system to input data and to make the intelligent data determinations required to provide highlypersonalized and sophisticated responses on a user's card. And again, even where such additional equipment is available, the Visual Card System has an unstable and confined method of displaying a response to a user in a limited area of the card.

In desiring to provide a personalized consumer response that draws that consumer's attention and focus, it would be useful to offer a system in which a response may be provided to a consumer beyond a simple visual display on the user card. Thus, a system is needed that offers users a highly-personalized and sophisticated response on the user card. In addition, it is desirable to have a system that can offer users additional responses beyond those on their user card such as sounds, lights, music, printed coupons, gift certificates, co-sponsored awards, or the like. In addition, it is desirable to provide such a system without the need for expensive additional equipment.

Accordingly, it is a primary object of the present invention to provide a system that, upon request, provides a personalized message, individually targeted promotion, or other such individually fashioned response to a user based on that user's demographic characteristics, current purchasing or other activities, personal purchasing history, and other external factors such as the date or time, with each of these elements being evaluated and processed through multiple decision trees.

A further object is to provide a system which is capable of storing and processing sufficient data to provide the user with sophisticated responses without the need for external storage, processing equipment, or data input means.

Still another object is to provide an economical system wherein a user may go to any location using the system at any time and receive a personalized response in real time based on up-to-the-minute information regarding that user.

It is a further object of the present invention to provide a marketing system which will provide a customer a feeling of individual significance.

It is a still further object to provide a system which is adaptable to any location regardless of the POS or operating system in place at that location.

Still another object is a system which encourages co-sponsored promotions by facilitating delivery of personalized and targeted promotions, coupons, or the like by more than one business or other such entity at all system locations without the need for expensive equipment, data translation, or interconnection.

It is another object to offer a system which provides the user with a stable and high-quality visual display on their user card.

A further object is to provide a system which delivers a visual, audible, or other such response to a user in addition to a printed message, coupon, or other such response.

SUMMARY OF THE INVENTION

The present invention relates to an affordable, yet effective, system, method, and related apparatus for determining, upon request, an appropriate personalized and individually-targeted response for a particular user based upon current user-specific data with real time delivery of that response to the user in non-volatile, erasable, re-writable visual format without the need to retrieve data from an outside source.

The invention comprises a transportable user card or record, which need not contain on-board processing capacity, and a printer/reader/writer ("PRW") apparatus. In one embodiment, the user card comprises a magnetic surface for writing, storing and re-writing machine-readable data and a thermo-reversible print region for receiving and visually displaying a determined response to a user in non-volatile, erasable, re-writable graphical or textual human-readable format. The PRW apparatus of this embodiment comprises magnetic read/write capabilities, thermo-chromic write/erase means, data entry and display means, and sufficient data storage and processing means. It is significant to note that while this summary focuses on this embodiment, other means for storage and retrieval of machine-readable data and for erasable/re-writeable visual display on the user card may be used without departing from the scope of the present invention.

The user card or record is equipped both with a magnetic surface for receiving and storing data in machine-readable format and with a separate area covered in a thermo-reversible or thermo-chromic type film for receiving, obliterating, and subsequent reception of modified or entirely different data in a human-readable format. The thermo-chromic and magnetic film region on the card may be in any size or shape and may, if desired, cover the entire card surface. As graphics and coloration may be placed on top of the magnetic surface without affecting its ability to store retrievable data, covering the entire card with magnetic film will not affect the aesthetic appeal of the card. Where the magnetic surface covers one entire side of the card, the card may be inserted into the PRW in either direction with information relating to separate programs being encoded on opposite sides of the card. Graphics may be placed on the associated ends of the card to direct the user as to which end to insert first to access a given program, creating an attractive card with multiple uses or co-sponsored programs. Further, although, at present, typical magnetic read/write heads accommodate only three lines of information, covering the entire side of the card with the magnetic surface facilitates larger read/write heads and, therefore, storage of more encoded information. In addition, the user record may be crafted in any chosen size or shape and of any material suitable for placement of the magnetic and thermo-chromic applications. For ease of carrying and to accommodate familiarity and comfort with the user, it is preferable to make the user record from a plastic and in the shape and size of a typical credit card.

The PRW of the present invention is designed to manage multiple applications previously handled by separate devices and to facilitate the interface of data stored within the PRW with data contained on the user card without the need for communication with an outside source. This has been achieved by including in one unit magnetic read/write capabilities, sufficient short- and long-term data storage capability, intelligent control and decision-making logic and intelligence, means for data entry, display means, customized data processing means, and means for thermo-chromic print, erasure, arid reprint of text in human-readable format and graphics.

The PRW is equipped with an entry slot or other such opening capable of receiving the user card or record. Disposed along the path of the user card within the PRW and aligned to coincide with the magnetic portion of the card are means for reading machine readable code from said magnetic portion of the user card. Data read from said magnetic portion may then be stored in data processing retrievable format in memory storage means within the PRW. Upon reading and storing the data from the card, the customized processing means may prompt the user through the display means for entry of data relevant to the current transaction. Such data may then be entered by means of a keypad or other such entry means positioned in an easily-accessible manner along the outer casing of the PRW. In the alternative, data entry relevant to the current transaction may be automatically entered into the PRW by means of connection via an input/output ("I/O") port to an external device such as a POS system or computer.

Upon receipt of data read from the card and entry of data relevant to the current user transaction, the customized processing means interfaces this information with program data stored in data processing retrievable format in the PRW's storage means. Through this interface, determinations are made as to an appropriate and personalized response for said user. Such response is then printed by the thermo-chromic print means to the thermo-chromic region of the user card. In one embodiment, in addition to the visual printout of a personalized response onto the user card, the processing means may also trigger a printer means which is capable of printing to hard copy. Such printer means may either be resident within the PRW or an external device interfaced with the PRW through an I/O port. Production of a hard copy printout facilitates production of items such as coupons, admission tickets, gift certificates, or merely messages or information in addition to that which is printed on the card itself. Printout of hard copy also plays an important role in the ability of the system to link promotions or other services of one business with those of another business or organization. For example, business A installs the system and uses it to promote repeat business through a frequent shopper program. As a reward for a specified number of visits, the system provides a coupon, gift certificate or other such reward for use at business B.

In addition to directing printouts of visual data to the thermo-chromic region of the card and to any hard copy printer means if so desired, the processing means also writes information relevant to the user's current transaction into the magnetic region of the user's card, rewriting and, thereby, updating the information previously stored there. The processing means also transfers data read from the card which identifies the user along with data relating to the current transaction into a storage means within the PRW, where it is saved in data processing retrievable format for later transport to a central database. Because the information on a user's card is kept current at all times, the usher may go immediately from one system site to another with the system at all locations being capable of responding based on up-to-the-minute user information. There is no delay in responding to a user's most recent transactions while waiting for the system to batch the current data, upload it to a central site, and download it again to other sites within the system.

Although communication with an external source is not required to complete an interaction with a user, a means of communication may be desirable to further enhanced the system of the present invention. According to one embodiment, a communication means is provided such that the system may transfer and/or receive data such as a user's personal or purchasing history, promotional offers, or updates to software resident in the PRW. Such a communication means may be provided either by connection through a parallel/serial port to an external communication device such as a modem or by means of integration of such a device within the PRW itself.

It should be appreciated that while this summary and the description which follows focus on use of the system of the present invention in the field of marketing applications such as frequent shopper programs, contests and the like; the system is equally adaptable to many alternative fields. For example, and not by way of limitation, the system could be used for: time and attendance record keeping with feedback and encouragement (perhaps rewards) to employees displayed on the card; gift certificates; debit cards; hotel keys, airline boarding passes with display of flight information and frequent-flyer awards, prepaid telephone cards with a displayed record of calls; video rental with frequent rental reward; library checkout with visual record to patron of return dates, or remote ticketing.

In addition, the PRW and the user card disclosed herein is designed to accept and read magnetic stripes as are found on debit or credit cards. Thus, where a communication device or other link to records is provided, the PRW may also serve as an independent credit verification system or debit card system. Accordingly, the system of the current invention may fulfill many different roles: a credit card with display of available credit on the card; or reward of a coupon after a dollar amount has been spent; display of flight information for an airline ticket purchased with the credit card information encoded on the card; and so on.

It should further be appreciated that while use of a magnetic stripe and thermo-chromic film are taught herein as the means of placing machine- and human-readable data on the user card, the system disclosed herein is not dependent on these specific embodiments. Other methods of storing machine-readable data or displaying human-readable data upon request on a user card may be known or become known which would come within the scope of the present invention. For example, one important alternative for storage of machine-readable data is use of an integrated circuit or IC card. The capacity of such a card to carry substantial user information is well known. The IC cards to date, however, do not have the capacity for a visual display to the user. Use of an IC card that includes a thermo-chromic print region would provide a unique dimension to the present invention. Such a card could either do away with the magnetic stripe or the stripe could be retained as an additional data source. The PRW would require only minor modification to accommodate interface with the IC portion of the card. The memory and processing capabilities of the PRW of the system disclosed herein allow for application software at the point where the card meets the reading terminal, as opposed to the dumb readers typically used to read IC cards. By integrating the functions of the system of the present invention with the typical uses for an IC card, a multi-function card could be offered to a user where one card could act as a credit card; debit card; frequency record and reward card; time and attendance card; and so forth, with visual display to the user. Similarly, other methods may become known which would provide the stable, high quality, yet erasable human readable display taught in this invention. Thus, it should be appreciated that other means of transportable storage of data in combination with a stable, high-quality print surface may be used within the scope of the present invention.

BRIEF DESCRIPTION OF THE DRAWINGS

FIG. 1 A is a front perspective view of a user card or record according to one embodiment of the present invention.

FIG. 1 B is a back perspective view of a user card or record according to one embodiment of the present invention.

FIG. 2 A is a front perspective view of a printer/reader/writer device according to one embodiment of the present invention.

FIG. 2 B is a front elevational view of the printer/reader/writer of FIG. 2A.

FIG. 2 C is a right elevational view of the printer/reader/writer of FIG. 2A.

FIG. 2 D is a top elevational view of the printer/reader/writer of FIG. 2A.

FIG. 2 E is a rear elevational view of the printer/reader/writer of FIG. 2A.

FIG. 3 A is an enlarged view of a user card as shown in FIG. 1 demonstrating use of the card in a frequent-shopper program;

FIG. 3 B is an enlarged view of a user card as shown in FIG. 1 demonstrating use of the card to reward a user's birthday;

FIG. 3 C is an enlarged view of a user card as shown in FIG. 1 demonstrating use of the card and a printed hard copy coupon for shared marketing promotions.

DESCRIPTION OF THE PRESENTLY PREFERRED EMBODIMENT

Figure 1A:
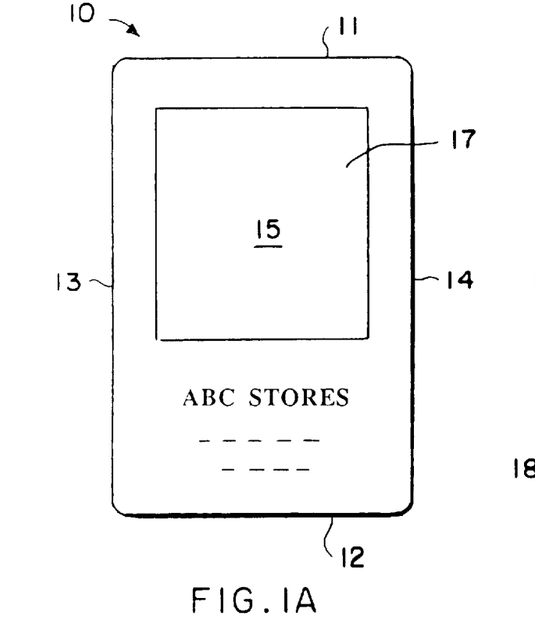
Figure 1B:
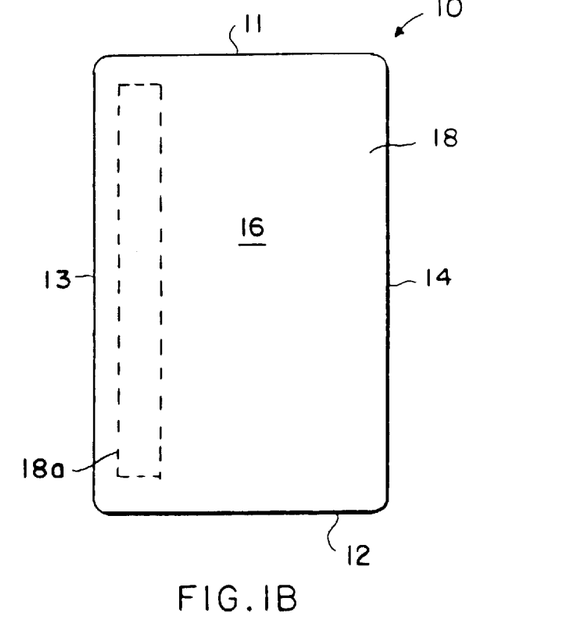
Figure 2A:
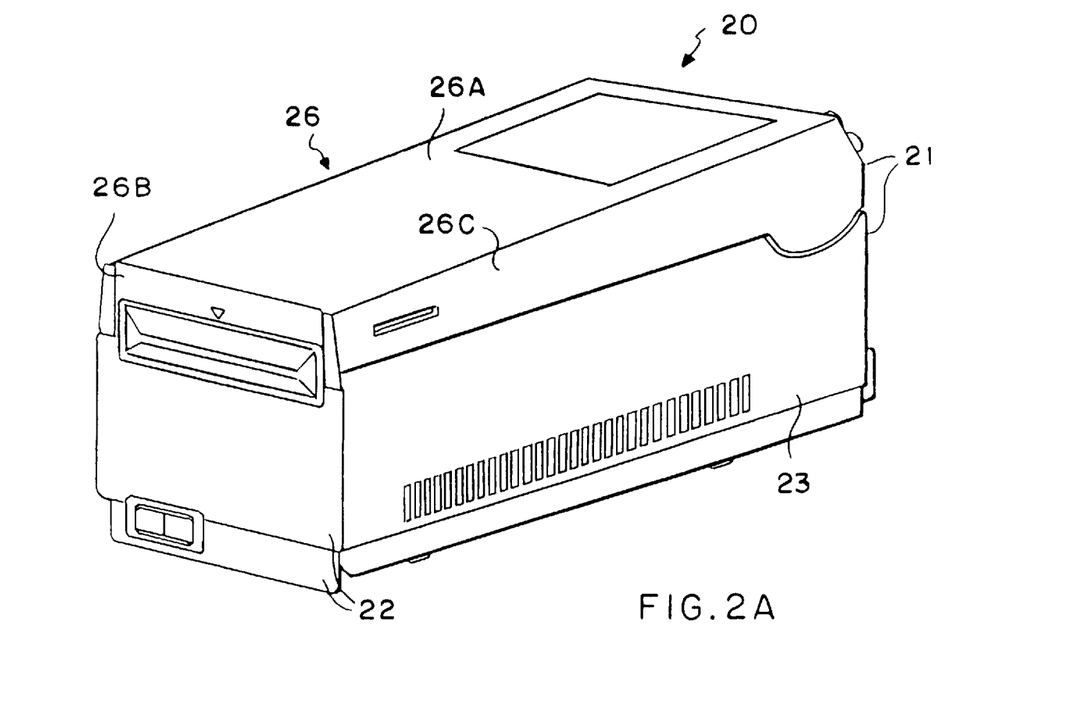

Reference is now made to the figures wherein like parts are referred to by like numerals throughout. Referring to FIGS. 1 and 2, a user card or record is shown generally at 10 and a perspective view of the general structure of a PRW device is shown generally at 20. Both are illustrated in accordance with one embodiment of the present invention. With particular reference to FIGS. 1A and 1B, the user card 10 is of the same size and composition as that generally used for a typical credit or debit card, being rectangular in shape with a top edge 11, a bottom edge 12, a left edge 13, a right edge 14, a front 15, and a back 16.

Disposed on the front 15 of the card 10 is a rectangular area covering approximately one-half of the card which represents the thermo-chromic write/erase region 17. While this embodiment teaches a defined area, the thermo-chromic film may be disposed across as much of the card as desired, defining a larger or smaller visual print region. The principles employed in the thermo-chromic or thermo-reversible print properties used herein are described in U.S. Pat. No. 5,188,815 to Coates et al.; U.S. Pat. No. 5,130,049 to Sage et al.; and U.S. Pat. No. 3,891,607 to Kuhn et al., among others. Other than the thermo-chromic print region 17, the front of the card may be colored in any chosen variation and imprinted with names, logos, or any other chosen designator, as illustrated in FIG. 1A. A magnetic surface 18 is placed on the back side of the card 16 (FIG. 1B) for the encoding of information. To provide sufficient storage capacity, it is preferable that the magnetic portion 18 accommodate at least three separate lines of data. In a preferred embodiment, magnetic film print region 18 covers the entire back side of the card. It is therefore possible to encode information for separate applications running along left edge 13 and right edge 14. Coloration and graphics may be placed over the entire magnetic surface area. If desired, coloration of an elongated rectangular stripe 18a running along the left edge 13 or right edge 14 may be added to assist the user, in proper placement of the card into the PRW. To manufacture such a card, sheets and/or rolls or thermo-chromic film material are presently available from Ricoh Electronics, Inc. in Santa Ana, Calif. Magnetic film is also generally available. These films are then printed, applied to card stock, and cut to the desired dimensions.

Figure 2B:
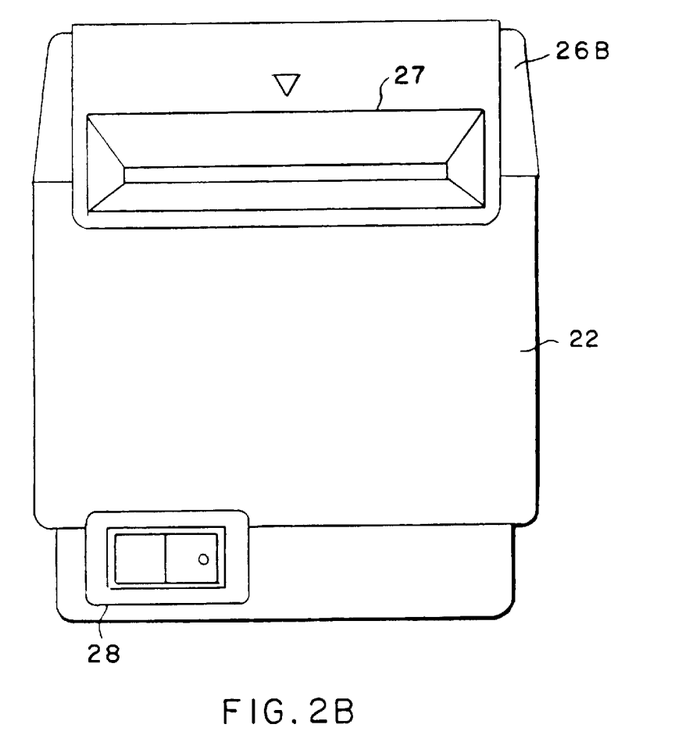
Figure 2C:
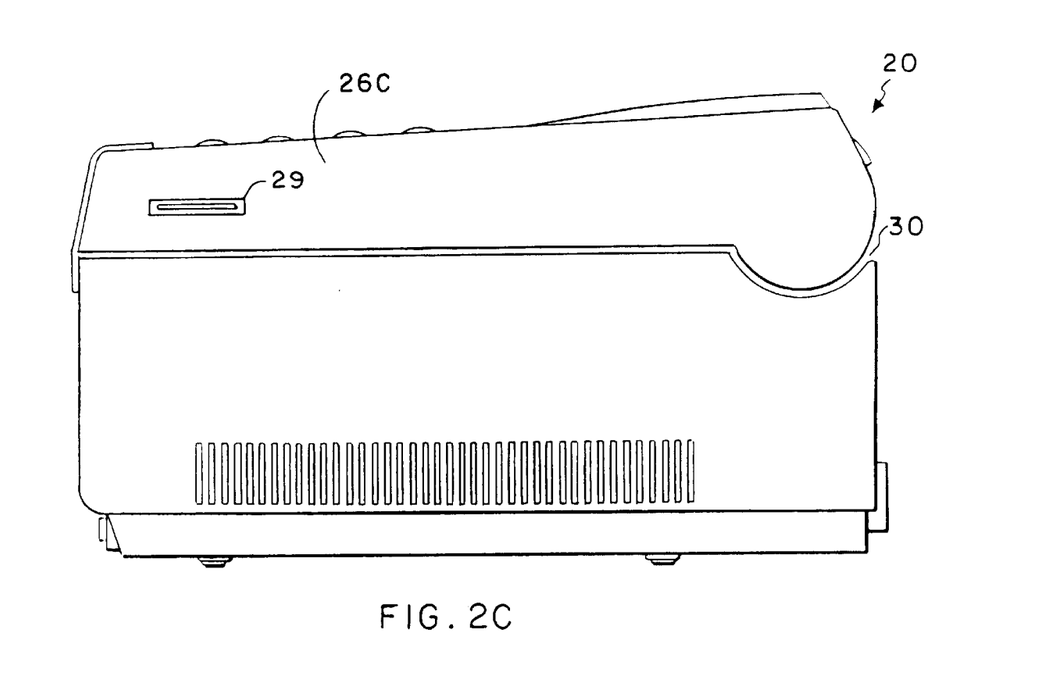

FIG. 2A presents a front perspective view of a representative example of a PRW device according to the current invention, designated generally at 20. The device is contained in an outer casing or housing 21 which has front panel 22; right panel 23; left panel 24 (not shown); back panel 25 (not shown); and cover 26 comprising top panel 26A, front lip 26B, right lip 26C, left lip (not shown), and back lip (not shown). Referring now to FIGS. 2B through 2E, a transverse slot or opening 27 is provided at the intersection of front panel 22 and front lip 26B of cover 26 (FIG. 2B) for entry of a user card or record 10 (FIG. 1). An on/off power switch 28 is placed in a convenient location on front panel 22 (FIG. 2B). A cover latch 29 is provided in right lip 26C of cover 26 (see FIG. 2C) to facilitate lifting of hinged cover 26 about hinge 30 to provide access to the mechanics within PRW 20.

Figure 2D:
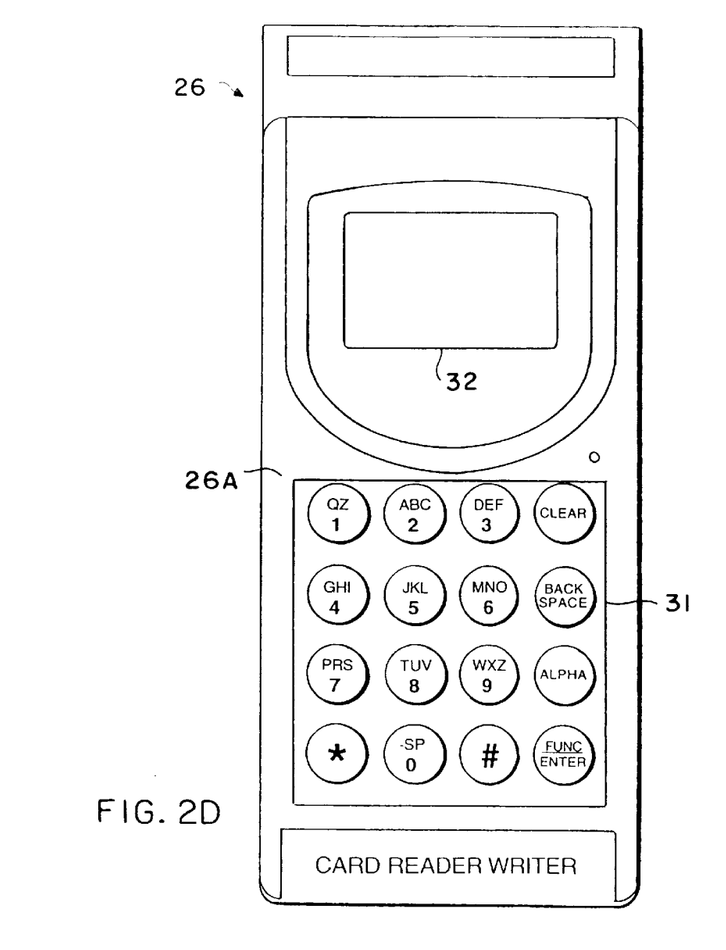
Figure 2E:
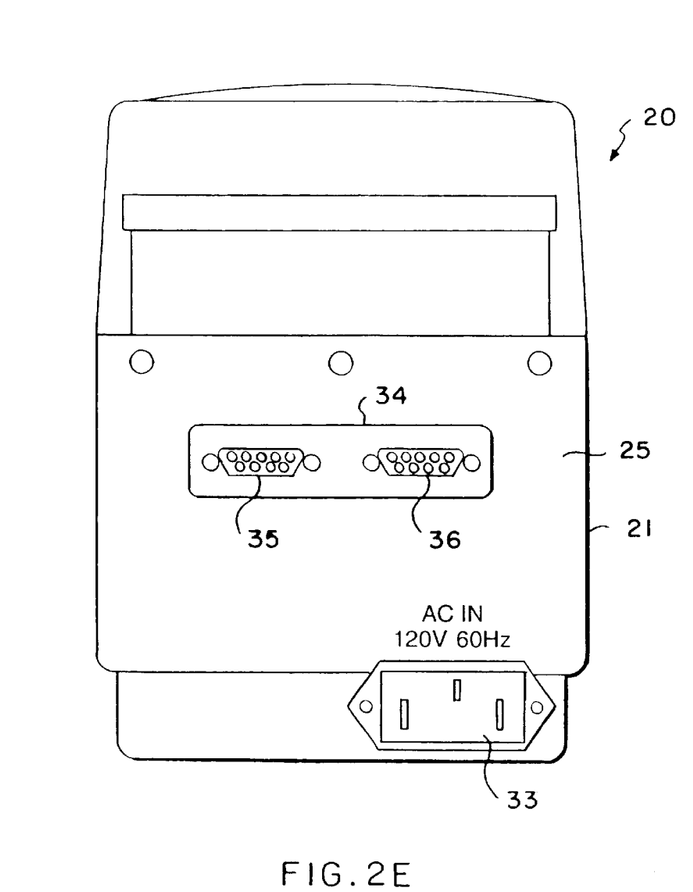

Top panel 26A of cover 26 is provided with a sixteen-key touchpad 31 and a multi-line liquid-crystal display ("LCD") 32 (see FIG. 2D). LCD 32 can be selectively used to provide a display of selected information that prompts the user to select from various programmed options.

Encased in PRW 20 are magnetic read/write means (not shown) that are situated to align the read and write heads with a selected portion of magnetic film print region 18 on card 10 as card 10 is inserted in slot 27. PRW 20 further contains thermo-chromic write/erase means (not shown) that are aligned for erasing and printing to the thermo-chromic region 17 on front 15 of card 10. Such magnetic read/write and thermo-chromic write/erase means are known in the art and are commercially available.

FIG. 2 E presents a rear elevational view of back panel 25 of the outer casing 21 which includes a power supply 33 and one or more input/output connectors ("I/O") 34. One such connector 35 is adapted to receive a multi-wire cable connected to a POS system or some other external data storage or processing device (not shown). Other connectors 36 (only one shown) are adapted to receive a multi-wire cable connected to peripheral devices (not shown) such as a modem, an external printer, or an external device for producing an audible or visual signal device to a user such as flashing lights, music, bells, or whistles. It is important to note that connection to a POS system or other data storage or processing unit, as well as connection to external peripherals, is not necessary to accomplish interaction with a user under the system of the present invention. Thus, I/O connectors 34 are provided merely as a means of offering additional dimension to the basic system.

For example, a POS system is not necessary in that PRW device 20 itself contains sufficient data memory and processing means to make intelligent decisions regarding sophisticated personalized responses based on current user data. Where a POS system is available, however, it can serve as additional storage and/or processing means and can automatically feed transaction information to PRW 20, if desired. Thus, PRW 2C0 is adapted via connector 35 with a means for linking to such a POS system.

Similarly, although external peripherals are not necessary for the system of the invention to interact with a user, addition of some peripherals may add a desirable dimension to the system's ability to communicate with the user. For instance, connection to a modem or other such communication device is not required to accomplish interaction with a particular user. It is beneficial, however, to have a communication link with a central host computer. A host can provide a central storage area for information regarding all users within the system. Data regarding new users and the purchasing history or other such updates relating to current users may be batched and uploaded to the central host daily or as desired. There is no urgency, however, other than to free up memory space at PRW 20 (FIG. 2), in that the current data required to interact with each user is carried directly on user card 10 (FIG. 1). A central storage of user data is beneficial for designing future promotions and cosponsored promotions as well as serving as a backup source in the event that a user should misplace his or her user card. Information regarding current promotions, contests, sweepstakes, new products and the like may be automatically downloaded from a central host to each system site through such a communication link as well. In addition, updates to the customized software resident in PRW 20 may also be sent via a communication link to a central host. Finally, if desired, a communication link allows the system to act as a typical credit or debit facility. Magnetic film print region 18 on user card 10 (FIG. 1) carries information identifying the user as on any credit or debit card. Thus, credit/debit verification can be provided through a simple query to a central credit verification source, as is done in any typical credit/debit card transaction, allowing PRW 20 (FIG. 2) to serve as a typical Verifone®.

Connection to other peripherals, although not required, may also be desirable. An external printer (not shown) provides the ability to print to hard copy such as a coupon in addition to the thermo-print onto user card 10. Such a device is particularly useful in facilitating co-sponsored promotions. Knowledge regarding the personal and purchasing history of a user accumulated through use of the system of the present invention may be used to design highly-targeted co-sponsored promotions with other businesses. Connection to an external printer may then be desirable as a means of printing targeted coupons or offers that may be used at these other businesses. Use of a thermal-type printer is desirable because it would permit printing of trademarks and graphics relating to several other businesses, all of which could be stored in the long-term memory and the processing means (not shown) resident within PRW 20 (FIG. 2). In another embodiment of the present invention, a printer and modem could be integrated within PRW 20.

Of particular significance is the data storage and processing means (not shown) resident in PRW 20. PRW 20 is endowed with sufficient long- and short-term data storage and data processing means to facilitate intelligent decisions and direct highly targeted responses to the user. It has been determined, at present, that at least four megabits ROM and four megabits RAM provide a desirable result, however, it should be appreciated that this is not a fixed parameter.

Customized software is provided to achieve the particularized result desirable under the promotional or other program being offered by the system. Software is necessary for several different functions. Operating system software directs operation functions such as magnetic and thermo-chromic read, write, erase, and/or print functions; temporary and long-term storage of user data read, data entry on keypad 31 (FIG. 2D); display on LCD 32 (FIG. 2D); storage and control of printout fonts; and interaction with external devices such as modems, printers, POS systems, or award alarm or signaling devices (not shown). Specialized application software is designed according to the particular program offered by the system to determine appropriate user responses. In determining appropriate user responses, the specialized application software correlates a user's personal and purchasing history as read from magnetic film print region 18 on user card 10 (FIG. 1); program data such as available promotions or awards, threshold values, prizes, limits, thresholds, rules, and messages which are stored in memory means in PRW 20; and information regarding the user's current transaction as input by means of keypad 31 or a POS system linked by connector 35. Determinations are made based on a series of rules and queries which direct the specialized application software to consider specific information regarding the user such as birth date, demographics, purchasing history, or other relevant user information to fashion a personalized response in the form of a visual message printed to the thermo-chromic region 17 on user card 10 (FIG. 1); a printed coupon; and/or a celebrating award symbol such as bells, whistles, flashing lights, or a chorus of happy birthday, to name only a few possibilities.

Finally, data acquisition software directs storage in memory means in PRW 20 of information relating to new users and information regarding the current purchases and awards of established users for upload to the central host at a later time. Daily upload is recommended in that it frees up the memory space within PRW 20. The application software also updates the data contained in the magnetic portion 18 of the user's card so that the user has with them up-to-the-minute information. This transportable storage enables the user to get an appropriate response from any system location at any time.

More specific details regarding the system of the present invention will be appreciated from a discussion of the system in interaction with a user. A typical interaction with a new and current user are described below with reference to the apparatus illustrated in FIGS. 1 and 2. Several approaches are possible in initiating a new user into the system. For instance, information from current marketing databases or other such sources may be used to create a user card carrying a particular user's personal and purchasing data. A unique user identification number is assigned to that user and encoded on the corresponding user card 10 and correlated with the file containing that user's data at a central host database. This user card 10 may then be sent to the user with an invitation for the user to join in the benefits of membership by bringing the card into a system site.

Another approach for initiating a new user is to provide an enrollment application (not shown) to a prospective user upon a first visit to a system location. This, application may seek basic personal information such as name, address, birth date, marital status, number and ages of children, as well as questions directed at determining basic product preferences, needs, and desires. Upon handing in the enrollment application, a blank user card 10 is issued to that user. Upon entry of user card 10 into PRW 20 through slot 27, operating system software will direct the magnetic read/write means to read the user data encoded on the card's magnetic film print region 18. Once it is determined that there is no data on the card, the card will be recognized as new and the imbedded application software, in conjunction with the operating system software, will direct that the current date and the next available user identification number be encoded into magnetic film print region 18 and displayed on LCD screen 31. Personnel at the system location manually write the assigned user identification number onto the application form. Where a laser or other printer means is available, printing of appropriately-numbered applications could be automatically triggered, thereby eliminating the possibility of human error. The user card is now ready to be used by the system as a transportable storage medium by receiving information regarding that user's current transaction.

If it is desired that the user card 10 carry information about the user beyond the user identification number and current transaction information, additional information may be added to the card in a variety of ways. For example, at the user's first visit, specialized application software may prompt by means of LCD display 32 for the entry of data via keypad 31 which may be written upon the user card 10 by the magnetic write means within PRW 20. Alternatively, completed user enrollment application forms are sent to a central data input site where information from the application regarding that particular user is entered into a central database and referenced against that user's user identification number. Any information already stored at the central host regarding that user's purchasing history may be encoded, along with selected data from the application form, onto a replacement user card and mailed to the user. According to another approach, once information regarding a particular user has been entered into a central database, it may be downloaded for temporary storage to PRW's or other storage means at individual system sites. When that particular user comes to a site and enters his or her temporary card, the system will recognize the user number and transfer the stored user data to magnetic stripe 18 on user card 10.

Figure 3A:
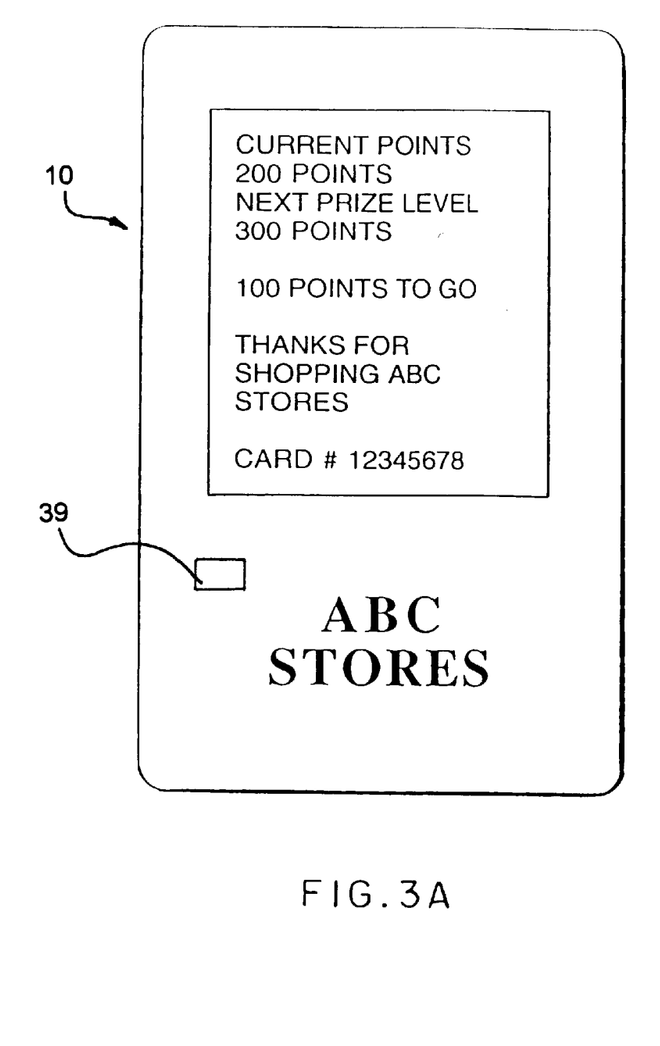

Alternatively, additional information can be stored on user card 10 (FIG. 3A) by use of an integrated circuit chip 39 on card 10 in addition to a thermo-chromic print region. Such a card could either do away with the magnetic stripe or the stripe could be retained as an additional data source. The PRW would require only minor modification to accommodate interface with the IC portion of the card.

Nevertheless, the system operates the same regardless of the method by which a properly-encoded card reaches the hands of a user. By means of LCD 32, the operating system software prompts the entry of information regarding the user's current purchase or transaction which may be entered by means of keypad 31 or through a direct link with a POS system as previously described (FIG. 2D). Information so entered will be temporarily stored in short-term memory for use by the system in determining the appropriate targeted response to the user.

Figure 3B:
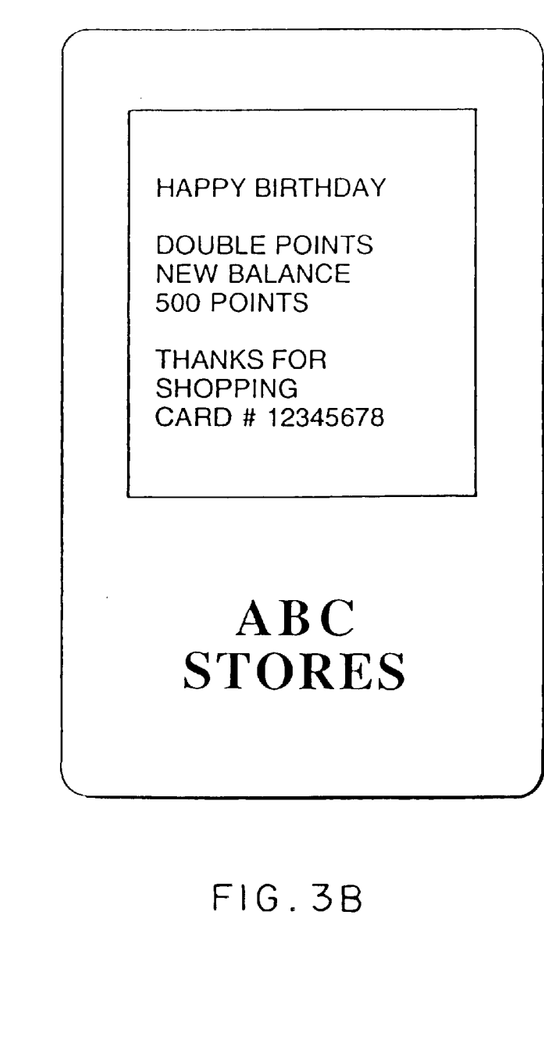
Figure 3C:
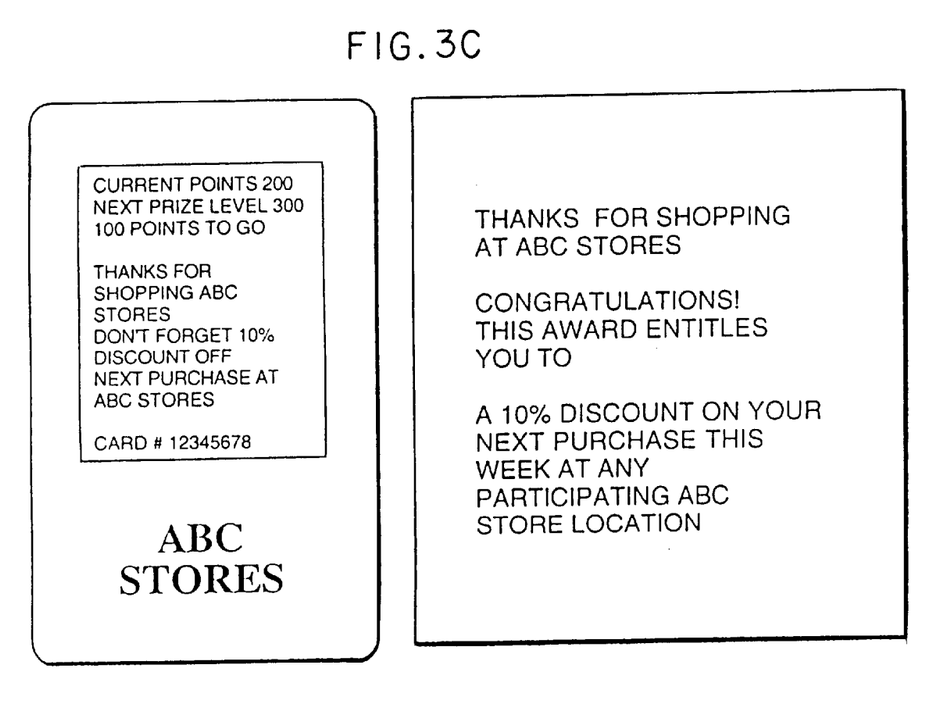

The specialized application software, stored in the PRW's long-term storage means, contains specific rules, tests, and parameters by which to judge user data and purchasing history to arrive at a personalized response. This specialized application software correlates and analyzes the user data now stored in short-term memory with current promotional offers available at that location stored in the PRW's long-term memory means. The application software is capable of making intelligent decisions taking into account the number of user visits, the products purchased at each visit, demographics regarding that particular customer, personal information such as birth dates, co-sponsored promotions which are appropriately targeted to that user, as well as specific information regarding that system location such as special promotions or product availability. As a result of this analysis, a highly-personalized and targeted response will be activated to the user. One response is in the form of a personalized message printed to region 17 on user card 10 by the thermo-chromic print means within PRW 20 (see FIGS. 3A, 3B, 3C as examples). There may also be direction given to an external printer to print a graphical display of a gift certificate, coupon, admission ticket or some other such promotion for the business at the system site or for use at another business (see FIG. 3C). In addition, a TTL signal may be sent via a cable connected to one of the 1/0 peripheral ports 34 as an activation signal to an external device capable of rewarding the user by way of flashing lights, buzzers, beepers, or even a musical composition.

The specialized application software in conjunction with the operating systems software will further direct that the magnetic writing means encode certain of the user data temporarily stored in the short-term storage means such as items purchased and the date onto magnetic stripe 18 of the user's card 10, thereby keeping the data contained on the user's card current. Further, some of the data stored in the short-term storage means may also be directed to be written into the long-term storage means for later transfer via a modem to a central host location.

Although these descriptions have focused on use of the direct targeted delivery system of the present invention as a marketing tool and, more particularly, for a frequent shopper type of program, it should be appreciated that the system of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. A system for determining a promotional program selected response for a particular user, the selected response being based upon continuously-updated current user data, with real-time delivery of said response to the user, the system comprising:

at least one printer/reader/writer terminal and at least one user card associated with the user for use in said terminal, said user card having,
   a region for receiving and storing machine readable code containing current user data comprising user personal data and user transaction history data,
   a thermo-reversible region for receiving and displaying information to the user in a non-volatile, erasable, re-writable, visual format,
said terminal comprising:
   means for reading machine-readable code stored on said user card and means for writing and rewriting machine-readable code to said user card;
   means for writing, erasing, and rewriting a response to said user upon said user card in said thermo-reversible region,
   means for entry of current transaction data,
   a set of terminal-stored promotional program rules,
   integrated means for storing and processing data, said means for processing data operating to calculate:
      a) a personal data promotion program response by analysis of said user personal data according to said set of terminal-stored promotional program rules,
      b) a promotional program result by evaluation of said user transaction history data, said entered current transaction data and promotional program data by application of said set of promotional program rules, and
      c) an updated current user data response and a user message response by application of said promotional program rules to said promotional program result and said personal data promotional program response,
said system delivering said promotional program selected response to said user in non-volatile, erasable, graphical, or textual human-readable format and updates said current user data to allow a subsequent promotional program selected response to incorporate said current transaction data in providing a subsequent response.

2. The system of claim 1 wherein said region for receiving and storing machine-readable code comprises a magnetic surface.

3. The system of claim 1 wherein said region for receiving and storing machine-readable code comprises integrated circuits on said user card.

4. The system of claim 1 wherein said region for receiving and displaying visual information to said user comprises a thermo-reversible print surface.

5. The system of claim 1 wherein said printer/reader/writer terminal further comprises means for connection to an external printing device.

6. The system of claim 1 wherein said printer/reader/writer terminal further comprises integrated printing means.

7. The system of claim 1 wherein said printer/reader/writer terminal further comprises communication means.

8. The system of claim 7 wherein said communication means is a port for connection to an external communication device.

9. The system of claim 7 wherein said communication means are integrated in said printer/reader/writer terminal.

10. The system of claim 1 wherein said printer/reader/writer terminal further comprises means for connection to a POS system or other computer system.

11. The system of claim 1 wherein said printer/reader/writer terminal further comprises means for connection to an external signaling device.

12. A method for determining and providing a computed promotional response for a particular user comprising the steps of:

(a) a set of response-determining promotional software program rules and promotional program data in memory on a printer/reader/writer terminal, (b) providing a user card to the user, (c) storing current user data in machine readable format on said user card, said current user data comprising: user personal data and user purchasing history data, (d) inserting said user card into said terminal to initiate determination of the computed promotional program response, (e) reading said current user data by said terminal, (f) entering a current transaction data into said terminal, (g) calculating the computed response by said terminal said calculating comprising:
   analyzing said user personal data according to said promotional program rules, to provide a personal data promotional program response,
   evaluating said user transaction history data, said transaction information and said promotional program data according to said promotional program rules, to provide a promotional program result, and
   applying said program rules to said promotional program result and said personal data promotional program response to determine the computed response wherein said computed response comprises an updated current user data response and user message response, (h) recording a human readable output based on said computed user message response on said user card in non-volatile, erasable/rewriteable, visual format of a thermo-reversible region, and (i) updating said user card with said second current user data in readable format, such that said user card is updated to reflect continuously current user data, and a personalized human readable message is delivered to the user in real time such response taking into account said program rules, said program data, said current transaction data, and current user data.

13. The user card of claim 12 wherein said read/write surface is of sufficient size and placement that machine-readable code may be written across the entire side of said user card.

14. The user card of claim 12 wherein said read/write surface is a magnetic surface.

15. The user card of claim 12 further comprising a print region for receiving and displaying a visual response to a user in non-volatile, erasable, graphical or textual human-readable format; said print region being placed on at least one side of said user card.

16. The user card of claim 15 wherein said print region comprises a thermo-reversible print surface.

17. The method as claimed in claim 12 further comprising the step of promoting the user to enter additional transaction information for use in calculating the computed response.

18. The method as claimed in claim 12 wherein the determined computed response further comprises a written response, and the method further comprises the step of issuing said user a printed hard copy response by a printer.

19. The method as claimed in claim 12 wherein the determined computed response further comprises an activation signal, and the method further comprises the step of sending said activation signal to a means for producing an audio or video output.

20. The method as claimed in claim 12 wherein said computed response further comprises providing a visual signal to the user.

21. The method as claimed in claim 12 further comprising the step of transferring to a central database said computed response.

* * * * *

UNITED STATES PATENT AND TRADEMARK OFFICE
CERTIFICATE OF CORRECTION

PATENT NO. : 5,932,869
DATED : August 3, 1999
INVENTOR(S) : Stephen Gottlich, et al.

It is certified that error appears in the above-indentified patent and that said Letters Patent is hereby corrected as shown below:

<u>In Column 7, Line 46,</u>  the patent now reads    arid reprint";
this should read —and—

<u>In Column 8, Line 35,</u>  the patent now reads    usher    this should read —user—

<u>In Column 16, Line 19,</u>  the patent now reads "a set of"; this should read —storing a set of—;

<u>In Column 16, Line 53,</u>  the patent now reads "data in readable format"; this should read —data in machine readable—,

UNITED STATES PATENT AND TRADEMARK OFFICE
CERTIFICATE OF CORRECTION

PATENT NO. : 5,932,869
DATED : August 3, 1999
INVENTOR(S) : Stephen Gottlich, et al.

It is certified that error appears in the above-identified patent and that said Letters Patent is hereby corrected as shown below:

<u>In Column 17, Line 7,</u>   the patent now reads "step of promoting"; this should read –step of prompting–;

Signed and Sealed this

Twenty-first Day of March, 2000

Attest:

Q. TODD DICKINSON

Attesting Officer   Commissioner of Patents and Trademarks